United States Patent
Eggleton et al.

(10) Patent No.: US 6,847,763 B2
(45) Date of Patent: Jan. 25, 2005

(54) COLORLESS TUNABLE DISPERSION COMPENSATOR

(75) Inventors: Benjamin J. Eggleton, Summit, NJ (US); Richard J. Ramsay, Somerville, NJ (US); Paul Steinvurzel, Woodcliff Lake, NJ (US)

(73) Assignee: Fitel U.S.A. Corp, Norcross, GA (US)

( * ) Notice: Subject to any disclaimer, the term of this patent is extended or adjusted under 35 U.S.C. 154(b) by 210 days.

(21) Appl. No.: 10/321,194

(22) Filed: Dec. 17, 2002

(65) Prior Publication Data

US 2004/0114863 A1 Jun. 17, 2004

(51) Int. Cl.⁷ .................................................. G02B 6/34
(52) U.S. Cl. ........................... 385/37; 385/15; 385/24; 385/27; 385/31; 398/81; 398/87
(58) Field of Search .............................. 385/15, 24, 27, 385/31, 37, 123; 398/81, 87

(56) References Cited

U.S. PATENT DOCUMENTS

| | | | |
|---|---|---|---|
| 5,982,791 A * | 11/1999 | Sorin et al. ................. 372/25 |
| 5,999,546 A | 12/1999 | Espindola et al. ........... 372/20 |
| 5,999,671 A | 12/1999 | Jin et al. ...................... 385/37 |
| 6,122,418 A * | 9/2000 | Ellis ............................. 385/27 |
| 6,148,127 A | 11/2000 | Adams et al. ................ 385/37 |
| 6,275,629 B1 | 8/2001 | Eggleton et al. ............. 385/37 |
| 6,304,696 B1 | 10/2001 | Patterson et al. ............ 385/37 |
| 6,351,585 B1 | 2/2002 | Amundson et al. .......... 385/37 |
| 6,356,684 B1 | 3/2002 | Patterson et al. ............ 385/37 |
| 6,370,300 B1 | 4/2002 | Eggleton et al. ............. 385/37 |
| 6,728,443 B2 * | 4/2004 | Chowdhury et al. ......... 385/37 |
| 6,768,822 B1 * | 7/2004 | Robinson et al. ............ 385/10 |
| 6,778,734 B2 * | 8/2004 | Baldwin et al. .............. 385/37 |
| 2002/0015549 A1 | 2/2002 | Pan et al. ..................... 385/15 |
| 2004/0071401 A1 * | 4/2004 | Eldada et al. ................ 385/37 |

* cited by examiner

*Primary Examiner*—Akm Enayet Ullah
*Assistant Examiner*—Daniel Petkovsek

(57) ABSTRACT

A colorless tunable dispersion compensator (TDC) comprises a plurality of N separate dispersion compensation elements, each centered at a different wavelength used in the communication system. A single tuning element is coupled to the plurality of separate dispersion compensation elements. A 1-out-of-N selector (such as a 1×N optical switch) is used to select the particular tunable dispersion compensation element to be implemented for an associated channel in the system. Advantageously, the same TDC can then be used in association with each channel in the communication system, as controlled by the 1-out-of-N selector to chose the particular compensation element for a specific channel wavelength.

12 Claims, 3 Drawing Sheets

COLORLESS TUNABLE DISPERSION COMPENSATOR

TECHNICAL FIELD

The present invention relates to a tunable dispersion compensator (TDC) arrangement and, more particularly, to a TDC that may be used with any desired transmission wavelength.

BACKGROUND OF THE INVENTION

Fiber optic transmission systems are becoming increasingly popular for data transmission due to their high speed and high capacity capabilities. A common and well-known problem in the transmission of optical signals is chromatic dispersion of the optical signal. Chromatic dispersion refers to the effect where the different wavelengths within a signal channel travel through an optical fiber at different speeds, e.g., shorter wavelengths travel faster than longer wavelengths or vice versa. This problem becomes more acute for high speed data transmission systems that operate at bit rates of 40 Gbps or higher, where the bit slots are narrower in time and the signal channels are wider in wavelength, since a pulse propagating in one bit slot may broaden and overlap with the adjacent bit, thus causing significant bit errors. In this case, it is necessary to compensate the dispersion before the pulse enters a receiver by recompressing the pulse. This correction is commonly achieved in the prior art by using either an optical filter (e.g., thin-film Fabry-Perot or Bragg grating) or including a section of specially-designed dispersion compensating fiber in the transmission system.

An additional problem is that the dispersion of an optical link can change over time. One common source of this time-dependence is ambient temperature fluctuations, which (due to the thermo-optic effect) cause the index of refraction of the fiber material to change and the corresponding dispersion relation to uniformly shift. At high bit rates, the time slot available for each bit is obviously much smaller than at lower bit rates, so the tolerance for such time-dependent changes in high bit rate systems is extremely low. Thus, in order to ensure that the dispersion is neither under- or over-compensated, it has become necessary to utilize a tunable dispersion compensator in high bit rate systems.

One exemplary tunable dispersion compensator is disclosed in U.S. Pat. No. 6,275,629, issued to B. J. Eggleton et al. on Aug. 14, 2001. In this arrangement, an optical waveguide grating with adjustable chirp is maintained in thermal contact with an electrically controllable heat-transducing body that varies the temperature along the length of the grating. The heat-transducing body can generate heat or remove heat from the grating to form a linear temperature gradient along the grating. By varying the voltage applied to the heat-transducing body, the refractive index of the fiber material is changed, thus changing (tuning) the dispersion compensation.

The Eggleton et al. arrangement is typically limited to a single channel arrangement and is therefore not compatible with reconfigurable optical networks that utilize "colorless" (i.e., operable at various signal wavelengths) receivers.

SUMMARY OF THE INVENTION

The need remaining in the prior art is addressed by the present invention, which relates to a tunable dispersion compensator (TDC) arrangement and, more particularly, to a TDC that may be used with any desired transmission wavelength, defined as a "colorless TDC".

In accordance with the present invention, a plurality of N separate tunable dispersion compensators, such as chirped fiber Bragg gratings (FBGs), are utilized to form a single colorless TDC, each compensator centered at a different system wavelength $\lambda_x$, where the plurality of gratings are combined in a single package and coupled to a single tuning arrangement. Exemplary tuning arrangements for dispersion compensators include, for example, a thermal tuning element or a mechanical strain-inducing tuning element. The packaged arrangement of the dispersion compensators and the tuning element is then coupled to a 1×N optical switch (or any suitable 1-out-of-N selector) to select the particular active channel for which tunable dispersion compensation is desired.

Thus, as the colorless TDC is used for different channels in the system (such as 40-channel WDM system), the 1×N switch is used to select the appropriate tunable FBG to be used for the associated channel.

An advantage of the arrangement of the present invention is that the same colorless TDC unit is implemented for use with each channel, regardless of the channel wavelength; there is no longer a need to individually select a FBG and associated tunable element for each channel, realizing a significant savings in manufacture and system implementation of TDCs for multi-channel systems.

Other and further advantages of the present invention will become apparent during the course of the following discussion and by reference to the accompanying drawings.

BRIEF DESCRIPTION OF THE DRAWINGS

Referring now to the drawings, where like numerals represent like parts in several views.

DETAILED DESCRIPTION

Figure 1:
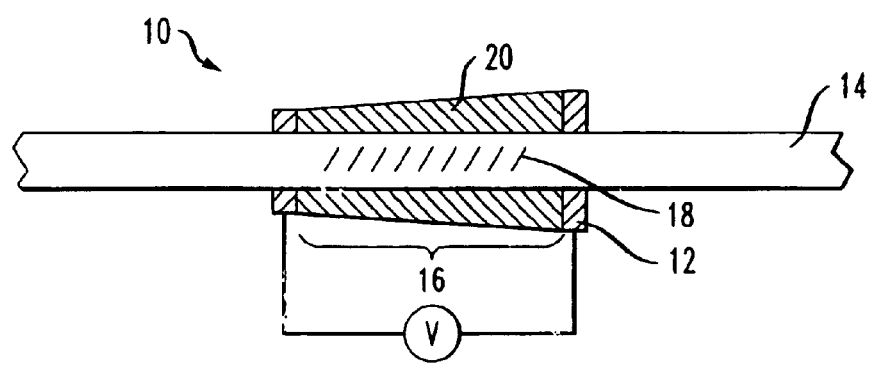
FIG. 1 illustrates an exemplary prior art TDC arrangement.

In order to understand the operation of the colorless tunable dispersion compensator (TDC) of the present invention, it is important to understand the basic operation of a conventional TDC element. FIG. 1 illustrates an exemplary dispersion compensation element 10 that is tunable by virtue of a heating element 12 disposed to surround dispersion compensation element 10, in this particular example a fiber Bragg grating (FBG). As shown, dispersion compensation element 10 comprises a length of optical fiber 14 including an optical grating 16 comprising a sequence of periodic index perturbations 18. Grating 16 is disposed in thermal contact with electrically-controllable heating element 12, where element 12 can be a heat-generating body or a body that actively removes heat. In most cases, element 12 comprises a heat-generating body such as a resistive film 20 that is deposited on fiber 14, where film 20 is formed to have a local resistance that varies along the length of the grating portion. Both the FBG and heating element are specially designed to provide linear (at 40 Gbps) or quadratic (at 160 Gbps) dispersion (also referred to as second order and third order dispersion, respectively). The grating is chirped, meaning that the period of the index perturbations varies along the axial direction, so that different wavelengths of light are reflected at different spatial positions in the grating. As a result, the reflections are time-delayed with respect to each other, resulting in chromatic dispersion. For second order dispersion compensation, the chirp rate function is designed to be linear, that is, the reflected wavelength is a linear function of position in the grating. As shown in FIG. 1, linear variation in the heating element can be imparted by linearly increasing the thickness of film 20. Since the refractive index of the silica fiber increases with temperature, a linear index gradient can be imposed along the length of grating 16 by virtue of applying heat to the dispersion compensating structure. Further, by varying the voltage applied to the heater, the magnitude of the temperature gradient may also be changed, thereby affecting the chirp rate and dispersion associated with the grating.

Figure 2:
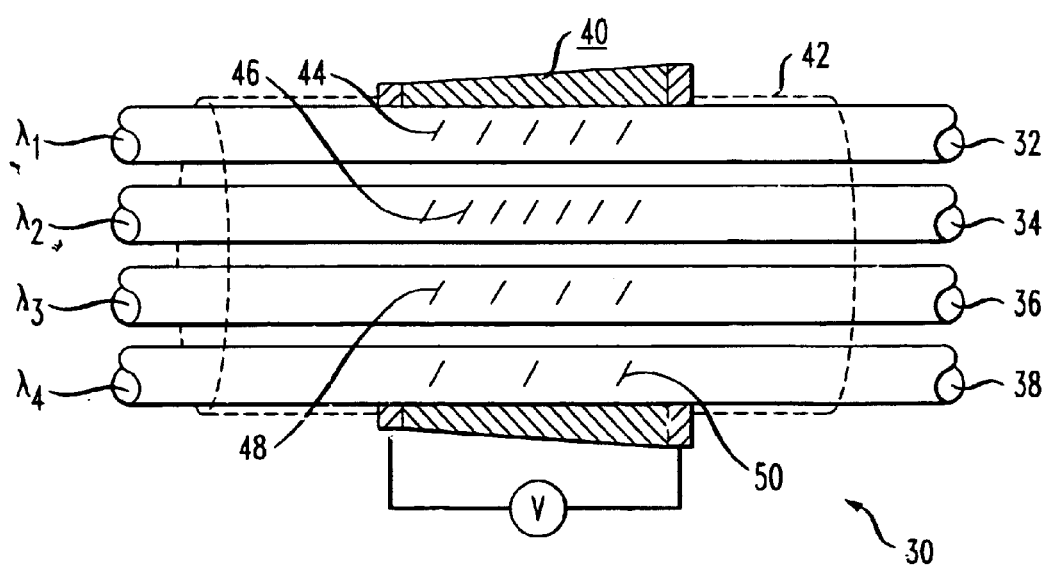
FIG. 2 illustrates the grating portion of an exemplary colorless TDC formed in accordance with the present invention.

Applying this teaching to the arrangement of the present invention, FIG. 2 illustrates an exemplary colorless TDC 30 of the present invention which is formed to comprise, in this simplified example, a set of four separate FBGs 32, 34, 36, and 38 that are all coupled to the same tuning element 40, where tuning element 40 in this case 20 comprises a heating element such as that discussed above in association with FIG. 1. The set of FBGs are combined and enclosed within a single capillary tube 42 so that each grating may be tuned and controlled by tuning element 40. In this simplified arrangement, FBG 32 is formed to exhibit a first chirped grating 44 that will reflect a signal at wavelength $\lambda_1$, second FBG 34 includes a second chirped grating 46 that will reflect a signal at wavelength $\lambda_2$, third FBG 36 includes a third chirped grating 48 that will reflect a signal at wavelength $\lambda_3$, and fourth FBG 38 includes a fourth chirped grating 50 that will reflect a signal at wavelength $\lambda_4$. Although this particular arrangement uses a heating element as the tuning element, it is to be understood that various other tuning arrangements may be used, including but not limited to, a device for introducing a tunable strain gradient along the grating. Exemplary arrangements for imparting a tunable strain gradient include, but are not limited to, the utilization of a tapered piezoelectric material or a bendable cantilever beam, either embodiment capable of physically changing the associated fiber grating so as to impart a changing strain on the grating and thus tune the dispersion associated with an optical signal passing through the grating.

Figure 3:
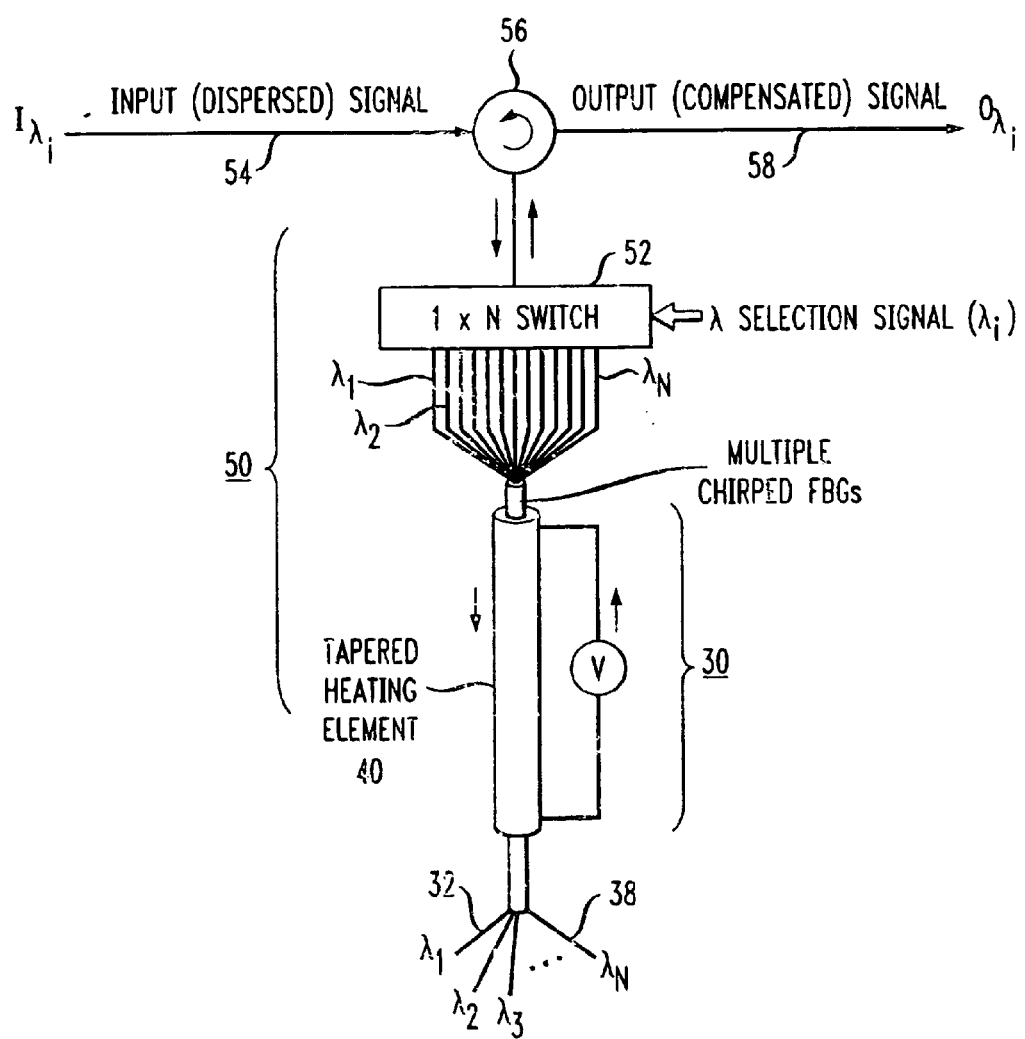
FIG. 3 illustrates an exemplary colorless TDC formed in accordance with the present invention.

FIG. 3 illustrates an exemplary colorless TDC system 50 of the present invention as it is used in association with a single channel of a multi-channel system. Colorless TDC system 50 includes a packaged FBG arrangement 30 and a single tuning element 40, as discussed above in association with FIG. 2. As shown, the plurality of fiber Bragg gratings 32, 34, 36 and 38 are applied as separate inputs to a 1×N optical switch 52 (or any other suitable type of 1-out-of-N channel selector). It is to be understood that a colorless TDC system of the present invention can be used with a plurality of N channels operating at different wavelengths; the arrangement using a set of four separate channels in FIG. 2 is used only for the sake of simplicity. Arrangements may utilize as many as 40 separate channels, with a set of 40 separate FBGs, the set of 40 FBGs combined in a single package and controlled by a single tuning element.

Referring back to FIG. 3, a wavelength selection signal is applied as an input to 1×N selector 52 (for example, a 1×n switch) so as to control the particular FBG that is used to provide tunable dispersion compensation for the applied input signal. In the particular arrangement of FIG. 3, the channel operating at wavelength $\lambda_i$ is selected, since an input signal I (which exhibits dispersion) operating at wavelength $\lambda_i$ is propagating along the associated input fiber 54. As shown, input signal I passes through a circulator 56 that functions to re-direct input signal I into 1×N switch 52 and thereafter through tunable dispersion compensator 30. Signal I then passes in both directions through TDC 30 (as reflected by the grating structure within TDC 30), which functions to remove the dispersion present in signal I. The dispersion-compensated signal I then passes through 1×N switch 52 and circulator 56 so as to be applied as the dispersion compensated output signal propagating along output fiber 58. Thus, in accordance with the present invention, although all N TDCs are simultaneously tuned by element 40, only the particular TDC centered at wavelength $\lambda_i$ is coupled to the signal path to/from circulator 56.

Figure 4:
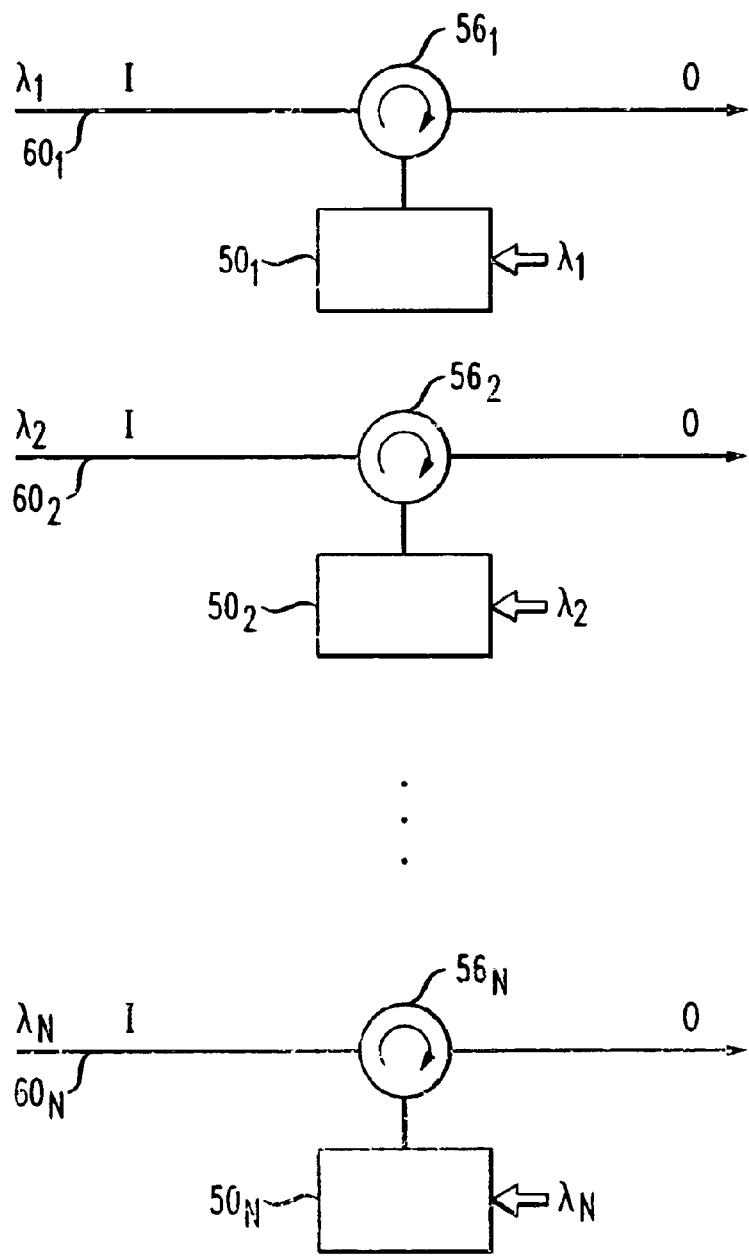
FIG. 4 illustrates a multi-channel implementation of the present invention, using a separate colorless TDC for each channel.

FIG. 4 illustrates a complete colorless TDC system of the present invention, as used with an N-channel communication system, such as a WDM optical communication system. As shown, the system utilizes a plurality of N input communication channels 60 (denoted as $60_1$, $60_2$, ..., $60_N$), each operating at different wavelength $\lambda_1$, $\lambda_2$, ..., $\lambda_N$, respectively. Associated with each channel is a separate colorless TDC unit 50, where each unit is identical in composition, the only difference being the wavelength selected for use by 1×N switch 52 with unit 50 (see FIG. 3). In accordance with the present invention, therefore, the manufacturing of a TDC element for a multi-channel system is simplified in that the same unit is used for each channel, with the operation of a 1×N switch used to select the particular FBG used to provide tunable dispersion compensation for the particular channel in used. In the arrangement as shown in FIG. 4, a "$\lambda_1$ select" signal is used as the input to colorless TDC $50_1$, a "$\lambda_2$ select" signal is used as the input to colorless TDC $50_2$, and so on, with a "$\lambda_N$ select" signal used as the input to TDC $50_N$. Since the same unit is used for each channel, therefore, the inventory of components required for servicing a multi-channel system is significantly reduced, resulting in a significant savings in manufacture, assembly and maintenance.

It is to be understood that the above-described embodiments of the present invention are illustrative only of a few of the many possible specific embodiments that can represent applications of the principles of the invention. Numerous and varied other arrangements can be made by those skilled in the art without departing from the spirit and scope of the invention.

What is claimed is:

1. A colorless tunable dispersion compensator for use with an optical transmission channel operating at any wavelength $\lambda_i$ within a wavelength range $\lambda_1$–$\lambda_N$ of a multi-channel system, the colorless tunable dispersion compensator comprising a plurality of N separate dispersion compensation elements, each centered at a separate one of the system wavelengths $\lambda_1$–$\lambda_N$;

a single tuning element, coupled to each element of the plurality of N separate dispersion compensation elements to provide simultaneous dispersion tuning to said plurality of N separate dispersion compensation elements; and a 1-out-of-N selector coupled at its input to the plurality of N separate dispersion compensation elements and controlled by a wavelength selection signal for choosing a particular element for use with the channel operating at a wavelength $\lambda_i$ and coupling the chosen element to the output of the 1-out-of-N selector.

2. A colorless tunable dispersion compensator as defined in claim 1 wherein at least one dispersion compensation element comprises a fiber Bragg grating.

3. A colorless tunable dispersion compensator as defined in claim 2 wherein the fiber Bragg grating comprises a chirped grating.

4. A colorless tunable dispersion compensator as defined in claim 1 wherein the compensator further comprises a capillary tube for containing the plurality of n separate dispersion compensation elements.

5. A colorless tunable dispersion compensator as defined in claim 1 wherein the single tuning element comprises a heat generating element disposed along the length of the plurality of N dispersion compensation elements for generating an axial change in the refractive index profile of the plurality of N dispersion compensation elements.

6. A colorless tunable dispersion compensator as defined in claim 5 wherein a linear, first-order change in refractive index is applied along the length of the plurality of N dispersion compensation elements.

7. A colorless tunable dispersion compensator as defined in claim 5 wherein a quadratic, second-order change in refractive index is applied along the length of the plurality of N dispersion compensation elements.

8. A colorless tunable dispersion compensator as defined in claim 1 wherein the single tuning element comprises a strain-inducing element for introducing a change in the dispersion compensation along the length of each dispersion compensation element.

9. A colorless tunable dispersion compensator as defined in claim 8 wherein the strain-inducing element comprises a piezoelectric element.

10. A colorless tunable dispersion compensator as defined in claim 8 wherein the strain-inducing element comprises a bendable cantilever beam.

11. A colorless tunable dispersion compensator as defined in claim 1 wherein the 1-out-of-N selector comprises a 1×N optical switch.

12. An optical communication system including a plurality of N separate channels, each operating at a separate wavelength $\lambda_1$–$\lambda_N$, the optical communication system comprising a plurality of N input communication paths, each for supporting an optical signal at a separate one of the wavelengths $\lambda_1$–$\lambda_N$, wherein optical dispersion occurs at each signal propagates along its associated communication path;

a plurality of optical circulators, each circulator including a set of three signal ports, with an associated one of the input communication paths coupled to a first signal port of the set of three signal ports;

a plurality of N output communication paths, each for support an optical signal at a separate one of the wavelengths $\lambda_1$–$\lambda_N$, a separate one of the plurality of N output communication paths coupled to a second signal port of the set of three signal ports of an associated optical circulator; and a plurality of colorless tunable dispersion compensation arrangements, each arrangement coupled to the third, remaining, signal port of the optical circulator, each dispersion compensation arrangement for compensating the dispersion present in the input optical signal and applying a dispersion compensated signal to the associated output communication path, wherein each colorless tunable dispersion compensation arrangement comprises a plurality of N separate dispersion compensation elements, each centered at a separate one of the system wavelengths $\lambda_1$–$\lambda_N$;

a single tuning element, simultaneously coupled to each element of the plurality of N separate dispersion compensation elements; and a 1-out-of-N selector coupled at its input to the plurality of N separate dispersion compensation elements and controlled by a wavelength selection signal for choosing a particular element for use with the channel operating at a wavelength $\lambda_i$, and coupling the chosen element to the output of the 1-out-of-N selector.

* * * * *